United States Patent [19]

Tongyai

[11] 3,999,957

[45] Dec. 28, 1976

[54] PROCESS OF COATING METAL AND RESULTANT PRODUCT

[75] Inventor: Singkata Tongyai, Sanibel Island, Fla.

[73] Assignee: Pennwalt Corporation, Philadelphia, Pa.

[22] Filed: June 5, 1974

[21] Appl. No.: 476,483

[52] U.S. Cl. .......................... 29/195; 260/29.6 ME; 260/29.6 MM; 260/29.6 MN; 260/29.6 WB; 427/379; 427/380; 427/409; 428/463; 428/510

[51] Int. Cl.$^2$ ...................... B05D 3/02; B32B 15/08

[58] Field of Search ...... 117/132 B, 132 C, DIG. 3; 148/6.2; 427/388, 379, 380, 409; 29/195; 428/463, 510; 260/29.6 MN, 29.6 MM, 29.6 ME, 29.6 WB

[56] References Cited

UNITED STATES PATENTS

| | | | |
|---|---|---|---|
| 2,971,934 | 2/1961 | Brown et al. | 117/161 |
| 3,053,692 | 9/1962 | Pocock | 148/6.2 X |
| 3,053,702 | 9/1962 | Schuster et al. | 148/6.2 |
| 3,346,522 | 10/1967 | Schuster et al. | 117/68 X |
| 3,382,111 | 5/1968 | Tongyai et al. | 148/6.16 |
| 3,472,681 | 10/1969 | Schuster et al. | 117/132 C |
| 3,516,847 | 6/1970 | Schuster et al. | 117/54 X |
| 3,585,084 | 6/1971 | Steinbrecher et al. | 148/6.2 |
| 3,840,392 | 10/1974 | Schuster et al. | 117/119.6 |

*Primary Examiner*—Harry J. Gwinnell
*Attorney, Agent, or Firm*—Robert G. Danehower

[57] ABSTRACT

Metal surfaces moving at high speeds are coated with a chromium-resin containing layer having improved adhesion and resistance to deformation. The coatings provide corrosion resistance to the metal as well as enhancing its appearance when a pigment is added. The improved metal coatings are obtained by processes which apply an aqueous dispersion containing a water soluble dichromate of a metal, a reducing agent for the dichromate consisting of a mixture of a lower alkanolamine and a hexitol, and an acrylic resin mixture consisting of about 5 to 22% by weight of thermosetting acrylic tetrapolymer and 95 to 78% by weight of thermoplastic acrylic copolymer to the metal surface and thereafter heating the metal to evaporate water and form a coating on the metal at a temperature ranging from about 180° to 275° F. and then curing the coating while simultaneously reducing the chromium in the dichromate by heating the metal within the range of about 400° to 500° F. for at least 2 seconds. Coating baths for preparing the chromium-resin coatings on metal as well as concentrates for preparing the coating baths are also disclosed.

28 Claims, No Drawings

PROCESS OF COATING METAL AND RESULTANT PRODUCT

BRIEF DESCRIPTION OF INVENTION

This invention is directed to new compositions and processes for placing an in situ reduced chromium-containing coating on metals. The processes and compositions are particularly adapted to coat metal surfaces moving at high speeds in continuous coating lines. Coatings of a type relating to this invention have been disclosed heretofore in U.S. Pat. Nos. 3,053,692, 3,053,702, and others. Application of a related coating to non-metals is disclosed in U.S. Pat. Nos. 3,472,681, 3,516,847 and Ser. No. 223,320, filed Feb. 3,1972. The teachings of these patents and application are incorporated herein by reference.

In applying these prior art chromium coatings to metal, a defect appeared in the coatings when the coated metal surface was subjected to impacting or deformation such as when the coated metal was bent and shaped in manufacturing articles from coated metal sheets or strips.

The improved coatings of this invention are obtained by the use of a novel combination of particular acrylic resins and the use of particular reducing agents to reduce hexavalent chromium to trivalent chromium in the curing operation. This invention is also directed to a particular method of heating and curing the coated surface so that a coating is obtained which is continuous and without pinholes. By high-speed coating line is meant a continuous coating line in which a metal is moved through the coating, drying and curing processes at a high speed of about 100 to about 600 feet per minute.

The novel coating baths of this invention are aqueous dispersions which contain a water-soluble dichromate of a metal having a valence greater than 1 in an amount ranging from about 4 to about 10% by weight of the dispersion and a reducing agent for the hexavalent chromium in the dichromate in an amount sufficient to reduce from about 75% to substantially all of the chromium of the hexavalent state to the trivalent state. The particular reducing agents of this invention are a mixture of a hexitol and a lower alkanolamine. The lower alkanolamine will be about 15 to about 50% by weight of the mixture of lower alkanolamine and hexitol. The combined weights of hexitol and lower alkanolamine in the coating bath will generally be from about 0.7% to about 1% by weight of the bath.

The resins used in the coating are a mixture of an acrylic thermoplastic copolymer and a thermosetting acrylic tetrapolymer. The mixture of acrylic resins constitute about 1 to 2 times the weight of the dichromate. The thermosetting acrylic tetrapolymer constitutes from about 5 to 50% by weight of the mixture of acrylic resins. A dispersing agent may be provided to maintain the above ingredients in a dispersed state. The chromates being soluble will, of course, be in solution in water.

The coating mixture is applied to the moving metal surface either by immersion of the metal in the coating bath, by layering the dispersion on the metal or by spraying the moving metal surface. Leveling rolls or other devices are used to regulate the amount of coating dispersion on the moving metal surface.

The metal carrying the coating dispersion on its surface is then moved to a drying zone to which heat is applied at low temperature in order to remove the water from the coating mixture. This is done at a temperature and rate which will not leave pinholes in the coating. Water removal generally takes place at a metal temperature within the range of about 180° F. to about 275° F. As soon as substantially all of the water is removed, the metal temperature is then brought within the range of 400° and 500° F. as rapidly as possible in order to cure the resins and reduce the hexavalent chromium to the trivalent state. This takes from about 2 seconds to about 3 minutes depending on the temperature used. Curing takes place in from about 2 to about 10 seconds at metal temperatures ranging from about 450° to about 500° F.

If a colored coating is desired on the metal surfaces pigments are added to the bath in amounts ranging from about 0.2% to about 5% by weight. When pigments are used coating weights ranging from about 170 to about 350 milligrams per square feet are applied in order to obtain good depth of color. Without the pigments, the coating weights can range from about 35 to 250 milligrams per square foot of metal surface depending on the amount of corrosion resistance desired.

In another aspect of my invention, a coating concentrate is provided for preparing the coating bath. This coating can contain all of the bath ingredients except the water-soluble dichromate. The dichromate and the reducing agents for the dichromate have to be maintained separately until they are placed in the bath and ready for use. Normally, a pigment is not included in the coating bath concentrate since this allows the use of different colored pigments for coloring the coating and by packaging the pigment separately greater flexibility is provided to the coating operator.

The coating concentrate is an aqueous mixture of the acrylic resins in dispersed form the said resins being those defined above for use in the coating dispersion. These resins will constitute from 8 to 20% by weight of the concentrate mixture. The reducing agents for the hexavalent chromium and the dichromates will be present in the coating concentrate. The ratio of acrylic thermoplastic resin to acrylic thermosetting resin in the resin mixture is within the range of 19:1 to 3:1. In this concentrate the ratio of total resins present to total reducing agents present will be in the ratio of 3:1 to 10:1. The sum of the acrylic resins and reducing agents will together constitute at least 25% by weight of the concentrate.

Detailed Description of Invention

The coatings of this invention are applicable to all metals. However, the coatings are particularly useful to those metals which have a need of pleasing appearance or corrosion resistance. Examples of such metals are mild black steel, copper and its alloys, stainless steel, galvanized steel, aluminum and aluminum alloys. The coatings of the present invention are particularly adapted to coat metal surfaces moving at high speeds, that is ranging from 100 to 600 feet per minute. Typical applications of metals moving at such speed are coil coating lines and wire coating lines.

The coatings of this invention are based on in situ reduced hexavalent chromium to trivalent chromium metal. At the same time, there is combined with the chromium an acrylic resin. The reduction of the hexavalent chromium to the trivalent state is effected by the presence of a reducing system which is effective at elevated temperatures. Coating and coating processes of this type have been disclosed in U.S. Pat. Nos. 3,053,693, 3,053,702 and 3,346,522 and the disclosures of these patents are herein incorporated by reference. Since the inventions disclosed in these patents were made, there has been a need for a coating of this type which will withstand the impact of an object and which will also withstand the mild deformations encountered in the manufacture of shaped articles from coils and strips of metal. This need arises from the fact that it is much more inexpensive to coat the metal prior to the formation of the metal into articles of commerce, such as, garbage pails and utility buildings.

In accordance with this invention, coatings having satisfactory resistance to impacting and to deformation are obtained by the use of a particular mixture of resins and by the use of a particular reducing system which allows reduction of the hexavalent chromium to the trivalent state at a lower temperature.

Prior to coating, the metal surfaces must be clean and free from soil. If the metals are clean and free from soil, they can be coated without any cleaning process, however, if the metal surfaces are soiled, they can be cleaned with alkaline cleaners followed by rinsing with water. If the cleaning operation is part of a continuous coating line, the metal which has just been cleaned and rinsed with water should be dried prior to moving into the coating bath in order to avoid drag-in of water which would dilute the coating bath.

The coatings of this invention are derived from a coating bath which is an aqueous dispersion of the hexavalent chromium source, the reducing system for the hexavalent chromium and the acrylic resins which form part of the coating.

The sources of the hexavalent chromium are the dichromates of the metals having a valence greater than 1. Zinc, calcium, copper, aluminum, magnesium, strontium, manganese and iron dichromates are suitable sources of the hexavalent chromium ion. Since the dichromates are not readily available, they can be prepared in the coating solution by substituting chromic acid and an oxide of the chromium-containing metal in proportions which would form the dichromate in the acid coating bath. The concentration of the dichromate in the aqueous coating dispersion will range from about 4 to about 10% by weight of the dispersion.

The reducing agents in this invention are a combination of a lower alkanolamine and a hexitol. Lower alkanolamines that are suitable for use in this invention include triethanolamine diethanolamine, diethanolmethylamine ethanol-dimethylamine, tri-isopropylamine, ethanol-dimethylamine and ethanol-ethylmethylamine. The hexitols suitable for use in my invention include mannitol, dulcitol, and sorbitol. Sorbitol is the alcohol most readily available and is preferred.

The amount of reducing mixture required in my dispersing bath will be that amount which will reduce from 75% to substantially all of the hexavalent chromium in the metal dichromates to the trivalent state. This amount is determined by first adding lower alkanolamine in an amount to give the desired pH within the range of about 4 to about 4.8. Then a hexitol is added in an amount which gives the necessary reduction of the hexavalent chromium in the curing step. Generally, the amount of hexitol will be about 1 to about 7 times the amount of lower alkanolamine. Preferably, the ratio of total reducing agents present to the metal dichromates present will be within the range of 12 to 18%. A preferred PH is about 4.6.

Higher amounts of the lower alkanolamine cannot be used since this would increase the pH to above 4.8 at which point the bath would be sufficiently alkaline to begin precipitating metal salts. A preferred concentration of lower alkanolamine in the reducing mixture is 25% by weight. We have found that this particular combination of reducing agents will effect substantially complete reduction of the hexavalent chromium to the trivalent chromium state at a temperature substantially lower and much faster than the use of straight sorbitol alone or sucrose alone. The lower curing temperature provides more flexible coating and one which will have greater resistance to impact.

The acrylic resins which I have found necessary to give the coating resistance to impact and to deformation in combination with the chromium ion is a mixture of a thermosetting acrylic tetrapolymer and an acrylic thermoplastic copolymer.

The thermoplastic acrylic copolymers used in this invention are the ethyl acrylate, methyl methacrylate copolymers described in U.S. Pat. No. 2,971,934 and the teaching of the patent is incorporated herein by reference. A particularly useful thermoplastic copolymer in my invention is that made from a composition containing 10 parts of methyl methacrylate to 8 parts of ethyl acrylate. This resin is sold by Rohm & Haas, Philadelphia, Pennsylvania under its designation Rhoplex C-72. As used hereafter in this specification and in the claims the designation acrylic thermoplastic copolymer will define an ethyl acrylate-methyl methacrylate copolymer of the type described in U.S. Pat. No. 2,971,934.

The acrylic thermoplastic copolymer may be prepared by mixing 3300 milliliters of deionized water, 200 grams of para-normal octyl phenoxy octaethoxy ethanol, 1000 grams of inhibitor-free methyl methacrylate, 800 grams of inhibitor-free ethyl acrylate, 36 milliliters of a solution of 0.3 gram $FeSO_4 \cdot 7H_2O$ (reagent grade) in 200 milliliters deionized water, 9 grams ammonium persulfate.

This mixture at room temperature is placed in a glass container and stirred while there is added 9 grams metabisulfite and 2.5 grams t-butyl hydroperoxide.

Stirring is continued until the temperature subsides after an initial rapid heat evolution. The reaction mixture is then cooled to room temperature and to it is added another batch of the same ingredients, all but the t-butyl hydroperoxide being dissolved in a quantity of deionized water one quarter of that used in the original batch. The t-butyl hydroperoxide is then added with stirring to cause the second batch to react and bring the resin content to about 46%.

The thermosetting acrylic tetrapolymer must be present in the mixture of polymers at a concentration from about 5 to about 50% by weight. The thermosetting acrylic tetrapolymer which is used in my invention is a polymer prepared from methyl acrylate, butyl acrylate, itaconic acid and n-methyolacrylamide monomers. The monomers will be present at about 50% to about 60% by weight butyl acrylate, from about 35% to 45% by weight methyl acrylate, from about 1% to about 3% by weight itaconic acid and from 3% to about 7% by weight of n-methylolacrylamide. These terpolymers may be prepared by the use of a redox catalyst comprising an oxidant selected from the group of inorganic persulfates, peroxides and hydroperoxides and as a reductant, an arylphosphinic acid or water-soluble salts thereof.

As used throughout the specification and claims an acrylic resin of the above described will be designated thermosetting acrylic tetrapolymer. A preferred thermosetting acrylic tetrapolymer is one prepared from about 38% by weight methyl acrylate, 55% by weight butyl acrylate, 2% by weight itaconic acid and 5% by weight n-methylolacrylamide.

The mixture of acrylic resin must be present in the coating dispersion bath in an amount ranging from about 1 to about 2 times the weight of the dichromates. Preferably, the ratio of the resins to the dichromates will be about 1.4 to 1.

The coating dispersion may contain dispersing and wetting agents. Normally, the resins are supplied in the form of an aqueous dispersion by the manufacturers so that there is generally sufficient dispersing agent present to maintain the solids in dispersion. However, if additional dispersing and/or wetting agents are required, they may be added as needed. Normally they would comprise from 0.03to 0.5% by weight of the bath. Optionally, the coating bath may contain a bactericide or preservative such as formaldehyde in a concentration of about 0.05% by weight.

The coating bath dispersion described above may be maintained in uniform composition by suitable agitation. This may take the form of an impeller type agitator or it may be accomplished by recirculating the bath through a centrifugal pump.

The aqueous dispersion described above will give coating weights after curing ranging from 35 to 250 milligrams per square foot. These coatings will be clear, adherent to the metal, will resist impact and are capable of moderate forming.

If the colored coating is desired, pigment may be added to the above coating bath in an amount ranging from about 0.2 to about 5% by weight. Suitable pigments for the purpose of the present invention are the more inert ones such as titanium dioxide, molybedote orange, green chromium oxide, carbon, iron oxide and the phthalocyanine pigments such as phthalocyanine blue and phthalocyanine green. The pigments give their best coloring or hiding effect when they are in very finally divided form such as when the particles are about 1 micron or smaller in size. Additional wetting agents or dispersing agents may be required when pigments are used in the coating bath. A coating dispersion containing pigments in the amounts indicated above will give satisfactory appearance in coating ranging from 170 to 350 milligrams per square foot of metal surface. A preferred color coating range is from about 200 to 250 milligrams per square foot of metal surface.

The coating dispersion described above will be applied to the rapidly moving metal surface by spraying, by immersion of the moving metals through the coating bath or by layering of the coating dispersion on the metal surface. After coating dispersion is placed on the moving metal surface, suitable means must be provided to regulate the amount of coating dispersion on the surface in order to control the final coating weights. Metering of the liquid film can be accomplished by grooved rolls or by use of an air knife.

After the desired quantity of coating dispersion is layered on the moving metal surface, the water contained in the aqueous dispersion must be removed at a regulated rate. If the water is removed too rapidly or too violently, pinholes will be left in the coating, and it will, of course, have lowered corrosion resistance and a less pleasing appearance. Accordingly, the water must be removed from the aqueous dispersion at a temperature and at a rate which will not leave pinholes in the surface. This is done by heating the metal within the temperature range of about 180° to about 275° F. Suitable sources of heat are infrared lamps, circulating hot air, and electric heating elements. As soon as substantially all of the water has been removed the temperature should be raised as rapidly as possible to the curing temperature. This may be done by directing the metal surface through a furnace having impinging gas flames, by the use of an electric induction furnace or by other means. It is necessary that the metal temperature be raised to within about 400° to about 500° F., preferably to about 450° F., as rapidly as possible. The metal should be held at this temperature from about 2 seconds to about 3 minutes depending on the temperature level. Three minutes may be required at 400° F. It is desired that the curing step should be operated at the lowest temperature possible which will give substantially complete reduction of the hexavalent chromium to the trivalent state in a reasonable time.

The impact resistance of the coatings may be measured by the Gardner Variable Impact Testing method described in National Coil Coaters Association Technical Bulletin No. 11-6, dated September, 1967. The ability of the coated metal to withstand bending and other deformations is described in the Paint Testing Manual, American Society for Testing and Materials, 13th Edition, 1972, page 334.

A coating concentrate convenient for preparing a coating bath described above forms another aspect of my invention. The coating concentrate comprises an aqueous dispersion of the acrylic coating resins and the reducing agents. Optionally, a pigment may be included. The metal dichromates cannot be a part of the coating concentrate since the dichromates must be separated from the reducing agent until the baths are ready to use. Otherwise, there would occur premature reduction of the hexavalent chromium.

The mixture of acrylic resins (defined as for the coating bath) in the concentrate will constitute from 8 to 20% by weight of the concentrate mixture. The ratio of acrylic thermoplastic copolymer to thermosetting acrylic tetrapolymer in the resin dispersion will be within the range of 19:1 to 1:1. The reducing agents in the concentrate will comprise the mixture of lower alkanolamines and hexitols described in connection with the coating dispersion bath. The ratio of acrylic resins to total reducing agents in the coating concentrate will be within the range of 8:1 and 10:1. The ratio of hexitol to lower alkanolamines in the reducing agent mixture will be within the range of 5:1 to 1:1. The total solids in the coating concentrate will be at least 25% by weight. Preferably, this solids content will be about 50% by weight. Pigment may be added to the concentrate in amounts from about 5 to about 20% by weight. The presence of pigment may increase the solids content to at least 30% by weight.

The best mode of practicing my invention will be evident from a consideration of the following examples.

EXAMPLE 1

A continuous strip of galvanized steel moving at a rate of 15 feet per minute was introduced to an aqueous dispersion coating bath having the following composition:

| | | |
|---|---|---|
| Thermoplastic copolymer of ethylacrylate and methylmethacrylate (Rhoplex C72–45% solids) | 13.4 | % |
| Formaldehyde | .003 | % |
| Sucrose (70% solids) | 3.12 | % |
| Wetting agent (Triton X-102-20% solids) | 1.25 | % |
| Phthalocyanine green pigment | 5.67 | % |
| Zinc oxide | 2.42 | % |
| Chromic acid | 6.12 | % |
| Water | 68.02 | % |

The coating bath was held at a temperature within the range of 80° To 100° F. After leaving the bath, the moving strip passed between two grooved rubber rolls in order to remove the excess coating liquid.

The coil strip carrying coating liquid on its surface then moved through a circulating air dryer. The coil strip then passed under infrared heaters and then through a gas fired flame. Infrared sensors indicated that a maximum temperature of 580° F. was obtained and that the metal was at a temperature above 450° for 12 seconds and above 400 °for 16 seconds. The coating failed the Gardner Impact Test at 60 and 80 pound inches. As for adhesion, the coated panel failed on both a 2-T and a 4-T Bend Test.

EXAMPLE 2

In an attempt to decrease the brittleness of the coating, the ratio of polymer to zinc oxide was increased in a bath having the following composition:

| | | |
|---|---|---|
| Rhoplex C72 (ethylacrylate methylmethacrylate copolymer-45% solids) | 15.3 | % |
| Sucrose (70% solids) | 1.85 | % |
| Formaldehyde | 0.005 | % |
| Wetting Agent | 0.48 | % |
| Phthalocyanine green pigment | 3.20 | % |
| Zinc oxide | 1.45 | % |
| Chromic Acid | 3.64 | % |
| Water | 74.07 | % |

A galvanized coil strip operating at a lines speed of 10–15 feet per minute was passed through the above bath and then between grooved rolls to remove excess coating solution. The coil then passed through infrared heaters and then through a gas flame curing oven. Infrared sensors indicated a metal temperature in the curing oven of 550° F. The metal was at a room temperature above 450° for 14 seconds and above 400° F. for 17½ seconds. The Gardner Impact Test and the T-Bend Tests were unsatisfactory. It was concluded that the curing temperatures were too high and that some means would have to be obtained for effecting complete reduction of hexavalent chromium at lower temperatures.

EXAMPLE 3

Laboratory work was undertaken to obtain a more effective reducing agent which would permit a lower curing temperature. In the composition of Example 2, a mixture containing 3 parts of sorbitol to 1 part of triethanolamine was substituted for the source in the bath composition of Example 2. An even coating of the bath composition was applied to galvanized steel panels by hand spraying them. The coated panels were then placed vertically in an electric oven and cured for 10–12 seconds at a temperature of 470°–500° F. After cooling, the panels were subjected to the Gardner Impact Test and the T-Bend Tests. The coatings failed in both tests.

EXAMPLE 4

In an attempt to obtain coatings having satisfactory impact resistance and T-Bend tests various combinations of thermosetting and thermoplastic acrylic resins were formulated, cured and tested. In each test, 23 grams of resin compositions were dispersed in the following bath:

| | | |
|---|---|---|
| Resin Composition | 23.0 | % |
| Carbowax Reducing Agent | 2.04 | % |
| Wetting Agent | 0.74 | % |
| Pigment | 5.10 | % |
| Zinc Oxide | 2.18 | % |
| Chromic Acid | 5.48 | % |
| Water | 61.46 | % |

The resin compositions were:

| | | |
|---|---|---|
| 1. | Thermosetting acrylic Rohm & Haas AC 604 | 75% |
| | Thermoplastic acrylic Rohm & Haas AC 35 | 25% |
| 2. | Thermoplastic acrylic (Rhoplex C-72) | 90% |
| | Thermoplastic acrylic Rohm & Haas Rhoplex B 60-A | 10% |
| 3. | Thermoplastic acrylic (Rhoplex C-72) | 75% |
| | Thermoplastic acrylic Rohm & Haas Rhoplex B 60-A | 25% |
| 4. | Thermoplastic acrylic (Rhoplex C-72) | 50% |
| | Thermoplastic acrylic Rohm & Haas Rhoplex B 60-A | 50% |

In each case the coating formulations were hand sprayed on galvanized panels and placed in an oven and cured for 5 minutes at 400° F. Following curing and after the panels had cooled, the panels were subjected to Gardener Impact and T-Bend Tests. All combinations of the resins gave coatings which failed both tests. In addition, the dispersion of resin A solidified in the bath and also failed from that standpoint.

EXAMPLE 5

71.3 grams of thermoplastic acrylic resin-Rhoplex C-72 (45% solids) and 18.2 grams of thermosetting acrylic tetrapolymer (46% solids) were dispersed in a bath containing 1.53 grams of a reducing agent (75% sorbitol and 25% triethanolamine). The bath also contained 7.45 grams zinc dichromate, 4.95 grams pigment and 59.6 grams water.

Galvanized steel panels were cleaned in alkalone solution, rinsed with water and dried. The bath composition was then hand sprayed on the galvanized panels and then placed in an oven at 450° F. for 5 minutes. The coated panels after cooling showed good Gardner Impact Test and excellent T-Bend Tests. The examples were then subjected to salt spray corrosion tests and showed good corrosion resistance after 72 hours.

EXAMPLE 6

A hexavalent chromium coating dispersion was prepared containing 18 grams of thermoplastic acrylic resin (Rhoplex C-72); 5 grams of a thermosetting acrylic tetrapolymer; 0.8 grams of dispersing and wetting agent; 0.05 grams of formaldehyde; 2.12 grams of zinc oxide; 5.36 grams of chromic acid; 4.9 grams of pigment; and 62.5 grams of water. Triethanolamine was added to this mixture with agitation in small amounts until sufficient amine was present to give the coating bath a pH of 4.6. This is the pH below the point at which the zinc dichromate will participate out of solution due to the alkalinity. The amount of triethanolamine constituted 1.35% by weight of the bath. Sorbitol was then added in the ratio of 3 parts of sorbitol for each part of triethanolamine. Galvanized panels were coated with this dispersion by hand spraying after which the panels were placed in an oven for 5 minutes at 400° F. The cured panels passed the Gardener Impact Test and T-Bend Tests.

EXAMPLE 7

The alkanolamine-sorbitol reducing system was tried on a continuous pilot plant coating line at line speeds ranging from 10 to 15 feet per minute. A galvanized coil passed continuously through a bath of the following composition:

| | | |
|---|---|---|
| Thermoplastic acrylic copolymer (Rhoplex C-72) | 23.0 | lbs. |
| Triton X 102 dispersing agent | 0.8 | lbs. |
| Formaldehyde | 0.05 | lbs. |
| Triethanolamine | 0.33 | lbs. |
| Sorbitol | 1.06 | lbs. |
| Pigment | 4.9 | lbs. |
| Zinc dichromate | 7.48 | lbs. |
| Water | 62.38 | lbs. |

The coil after leaving the bath passed through grooved rubber rolls to remove excess coating solution and was then moved under infrared heaters and finally through a gas fired furnace. Peak metal temperatures in the gas fired oven was about 450° F. Test panels from the coated coil failed Gardener Impact Test and T-Bend Tests.

EXAMPLE 8

The following procedure of Example 7, coating experiments were conducted on galvanized zinc strip moving through coating baths which varied in resin composition. Separate portions of the coil moved through only one of the baths. Each coating bath had the following basic composition to which was added the resin compositions listed below:

| Basic Bath | | | |
|---|---|---|---|
| Sorbitol (70%) | | 0.74 | lbs. |
| Triethanolamine | | 0.35 | lbs. |
| Dispersing and Wetting Agent | | 0.15 | lbs. |
| Formaldehyde | | 0.05 | lbs. |
| Chromic Acid | | 5.37 | lbs. |
| Zinc Oxide | | 2.13 | lbs. |
| Water | | 91.21 | lbs. |
| Bath A- | Thermoplastic acrylic copolymer (Rhoplex C-72) | 10.37 | lbs. |
| Bath B- | Rhoplex C-72 | 9.86 | lbs. |
| | Thermosetting acrylic tetrapolymer | 0.51 | lbs. |
| Bath C- | Rhoplex C-72 | 9.34 | lbs. |
| | Thermosetting acrylic tetrapolymer | 1.03 | lbs. |
| Bath D- | Rhoplex C-72 | 8.29 | lbs. |
| | Thermosetting acrylic tetrapolymer | 2.08 | lbs. |

At line speeds of 15 feet per minute, coating weights were obtained of approximately 250 milligrams per square foot. Samples of the continuously coated coil were then subjected to Gardner Impact Test and T-Bend Tests. Curing was effected at a maximum temperatures of 450° F. All adhesion and deformability tests were satisfactory except Bath A which did not contain any of the acrylic cross-linking resin.

EXAMPLE 9

Chromium-containing coatings were applied in accordance with this invention to continuously moving galvanized steel strips ranging in width from 30 to 55 inches by flooding with an aqueous dispersion coating bath. As the moving coil left the coating bath, the coating solution was leveled by the use of grooved rolls or an air knife. Line speeds ranged from 100 to 500 feet per minute. After the coating solution was leveled, the coil having the coating solution on its surface passed under infrared heating lamps where nearly all of the moisture was removed from the coating solution. The coil was then moved through an electric induction heating furnace where the temperature of the metal was raised to a peak temperature of about 450° F. Curing time in the induction furnace, depending at line speeds, ranged from about 2 to about 10 seconds. The following compositions gave coating weights ranging from 170 to 350 milligrams per square foot.

| | |
|---|---|
| Triethanolamine | 0.35 % |
| Sorbitol | 0.74 % |
| Zinc Dichromate | 7.50 % |
| Formaldehyde | 0.05 % |
| Dispersing Agents | 1.75 % |
| Thermoplastic acrylic copolymer of ethylacrylate and methylmethacrylate (Rhoplex C-72-solids) | 8.14 % |
| Thermosetting acrylic tetrapolymer | 2.23 % |
| Water | 74.32 % |
| Pigment | 4.92 % |

Samples of the above coils when subjected to Gardner Impact Tests and T-Bend Tests were satisfactory.

EXAMPLE 10

Following the procedure set forth in Example 9, commercial coil coating lines were operated in the bath composition given in Example 9, except that no pigment was present. Coating weights obtained range from 35 to 250 milligrams per square foot. All coatings gave satisfactory Gardner Impact and T-Bend Tests.

EXAMPLE 11

Using the coating composition and procedure given in Example 5, panels of mild black steel, stainless steel, and aluminum alloy were coated. In all three metals, the coatings were uniform of good adhesion and pleasing appearance.

EXAMPLE 12

A concentrate for preparing the coating bath of Example 9 contained 71.5% by weight of acrylic thermoplastic copolymer (45% solids), 20% by weight of thermosetting acrylic tetrapolymer (46% solids), 3% by weight dispersing agent, 0.2% bactericide, 1.3% by weight triethanolamine and 4.22% by weight sorbitol (70% solids). When a green phthalocyanine pigment is required, it is added to the above concentrate in an amount constituting about 17% by weight. When blue phtholocyanine pigment is desired, it need only constitute about 8% by weight of the bath.

I claim:

1. The process of coating a metal surface with an adherent chromium-containing coating, said process being characterized by applying to the surface of the metal an aqueous coating dispersion of: (a) a water-soluble dichromate of a metal having a valence greater than 1 in an amount ranging from about 4 to about 10% by weight of the dispersion; (b) a reducing agent for the dichromate in an amount sufficient to reduce from about 75% to substantially all of the hexavalent chromium in the trivalent state, said reducing agent consisting essentially of a mixture of lower alkanolamine and a hexitol, said lower alkanolamine being present in the reducing agent mixture at a concentration of from about 15 to about 50% by weight; and (c) an acrylic resin mixture in an amount ranging from about 1 to about 2 times the weight of the said dichromate, said resin mixture consisting of about 5 to about 22% by weight of a thermosetting acrylic tetrapolymer and from 95 to 78% by weight of an acrylic thermoplastic copolymer; removing water from the aqueous dispersion on the metal surface at a rate which will not leave pinholes in the coating by heating the metal to a temperature within the range of about 180° to about 275° F. until substantially all of the water has been removed and thereafter curing the coating while simultaneously reducing the chromium in the dichromate from the hexavalent state to the trivalent state by heating the metal to a temperature within the range of about 400° to 500° F., for at least 2 seconds; said aqueous coating dispersion being applied to the metal surface in an amount to give a coating weight after curing of about 35 to about 250 milligrams per square foot.

2. The process of claim 1 in which the aqueous dispersion also contains pigment in an amount ranging from about 0.2% to about 5% by weight and the amount of aqueous dispersion placed on the metal surface is regulated to give coating weights after curing ranging from about 170 to about 350 milligrams per square foot of metal surface.

3. The process of continuously coating a metal surface moving at speeds within the range of 100 to 600 feet per minute with an adherent chromium-containing coating, said process being characterized by applying to the surface of the metal an aqueous coating dispersion of: (a) a water-soluble dichromatic of a metal having a valence greater than 1 in an amount ranging from about 4 to about 10% by weight of the dispersion; (b) a reducing agent for the dichromate in an amount sufficient to reduce from about 75% to substanitally all of the hexavalent chromium in the dichromate to the trivalent state, said reducing agent consisting essentially of a mixture of a lower alkanolamine and a hexitol, said lower alkanolamine being present in the reducing agent mixture at a concentration of from about 15 to about 50% by weight; and (c) an acrylic resin mixture in an amount ranging from about 1 to about 2 times the weight of the said dichromate, said resin mixture consisting of about 5 to about 22% by weight of a thermosetting acrylic tetrapolymer and from 95 to 78% by weight of an acrylic thermoplastic copolymer; removing water from the aqueous dispersion on the metal surface at a rate which will not leave pinholes in the coating by heating the metal to a temperature within the range of about 180° to about 275° F. until substantially all of the water has been removed and thereafter curing the coating while simultaneously reducing the chromium in the dichromate from the hexavalent state to the trivalent state by heating the metal to a temperature within the range of about 400° to 500° F., for at least 2 seconds; said aqueous coating dispersion being applied to the metal surface in an amount to give a coating weight after curing of about 35 to about 250 milligrams per square foot.

4. The process of claim 3 in which the aqueous mixture contains sufficient dispersing agent to maintain the solids in dispersed form.

5. The process of claim 1 in which the lower alkanolamine and hexitol in the aqueous dispersion constitute together from about 0.7 to about 1.0% by weight and the lower alkanolamine is at leasst about 15 but not more than about 25% of the combined weights of lower alkanolamine and hexitol.

6. The process of claim 2 in which the lower alkanolamine and hexitol in the aqueous dispersion constitute together from about 0.7 to about 1.0% by weight and the lower alkanolamine is at least about 15 but not more than about 25% of the combined weights of lower alkanolamine and hexitol.

7. The process of claim 1 in which sufficient lower alkanolamine is added to the aqueous dispersion of the dichromate and resin to obtain a pH of about 4.6 and thereafter hexitol is added to the solution in an amount three times that of the lower alkanolamine.

8. The process of claim 2 in which sufficient lower alkanolamine is added to the aqueous dispersion of the dichromate and resin to obtain a pH of about 4.6 and thereafter hexitol is added to the solution in an amount three times that of the lower alkanolamine.

9. The process of claim 3 in which sufficient lower alkanolamine is added to the aqueous dispersion of the dichromate and resin to obtain a pH of about 4.6 and thereafter hexitol is added to the solution in an amount three times that of the lower alkanolamine.

10. The process of claim 1 in which the alkanolamine is triethanolamine and the hexitol is sorbitol.

11. The process of claim 2 in which the alkanolamine is triethanolamine and the hexitol is sorbitol.

12. The process of claim 3 in which the alkanolamine is triethanolamine and the hexitol is sorbitol.

13. The process of claim 1 in which the acrylic thermoplastic resin is a copolymer of ethyl acrylate and methyl methacrylate.

14. The process of claim 2 in which the acrylic thermoplastic resin is a copolymer of ethyl acrylate and methyl methacrylate.

15. The process of claim 3 in which the acrylic thermoplastic resin is a copolymer of ethyl acrylate and methyl methacrylate.

16. The process of claim 1 in which the metal dichromate is zinc dichromate.

17. The process of claim 1 in which the metal dichromate is zinc dichromate.

18. The process of claim 3 in which the metal dichromate is zinc dichromate.

19. The process of claim 1 in which the metal surface being coated is galvanized zinc.

20. The process of claim 2 in which the metal surface being coated is galvanized zinc.

21. The process of claim 3 in which the metal surface being coated is galvanized zinc.

22. A metal having a surface coating of about 35 to about 250 milligrams per square foot said coating being produced by the process of claim 1.

23. The coated metal of claim 22 in which the metal surface is galvanized steel.

24. The coated metal of claim 22 in which the metal surface is aluminum.

25. A metal having a colored surface coating of about 170 to about 350 milligrams per square foot said coating being produced by the process of claim 2.

26. The coated metal of claim 25 in which the metal surface is galvanized steel.

27. The coated metal of claim 25 in which the metal surface is aluminum.

28. The process of claim 3 in which the aqueous dispersion also contains pigment in an amount ranging from about 0.2% to about 5% by weight and the amount of aqueous dispersion placed on the metal surface is regulated to give coating weights after curing ranging from about 170 to about 350 milligrams per square foot of metal surface.

* * * * *